United States Patent
Böhm et al.

(10) Patent No.: US 6,869,133 B2
(45) Date of Patent: Mar. 22, 2005

(54) MULTI-LAYERED VEHICLE BODY PART AND METHOD OF MANUFACTURE

(75) Inventors: Horst Böhm, Frankfurt am Main (DE); Rainer Grimm, Frankfurt am Main (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/369,062

(22) Filed: Feb. 18, 2003

(65) Prior Publication Data

US 2003/0155792 A1 Aug. 21, 2003

(30) Foreign Application Priority Data

Feb. 21, 2002 (DE) .......................... 102 07 295

(51) Int. Cl.[7] .............................................. B62D 25/06
(52) U.S. Cl. .................. 296/191; 296/901.01; 296/210
(58) Field of Search ........................... 296/191, 901.01, 296/210

(56) References Cited

U.S. PATENT DOCUMENTS

| | | | |
|---|---|---|---|
| 3,591,444 A | 7/1971 | Hoppe | |
| 4,705,716 A | 11/1987 | Tang | |
| 5,320,869 A | 6/1994 | Eisfeller et al. | |
| 5,845,458 A | * | 12/1998 | Patel ........................... 296/210 |
| 2003/0168890 A1 | * | 9/2003 | Hock et al. ................. 296/210 |
| 2004/0169400 A1 | * | 9/2004 | Langhoff et al. ........... 296/191 |

FOREIGN PATENT DOCUMENTS

| | | |
|---|---|---|
| DE | 37 12 926 A | 11/1988 |
| DE | 38 20 845 A1 | 12/1988 |
| DE | 39 08 433 A1 | 9/1989 |
| EP | 1 086 882 A | 3/2001 |
| EP | 1 101 590 A1 | 5/2001 |
| JP | 2000 289 649 A | 2/2001 |

OTHER PUBLICATIONS

Search report, dated May 16, 2003.
Search report, dated May 7, 2002.

* cited by examiner

Primary Examiner—Jason Morrow
(74) Attorney, Agent, or Firm—Carlson, Gaskey & Olds

(57) ABSTRACT

A mountable vehicle body part has a visible outer surface and includes a outer plastic sheet, an inner fiber-reinforced layer made of plastic, and a protective layer disposed between the plastic sheet and the fiber-reinforced layer. The protective layer is made of plastic and prevents direct contact between the fibers fiber-reinforced layer and the plastic sheet. The protective layer prevents the fibers from marring the outer surface of the plastic sheet.

20 Claims, 2 Drawing Sheets

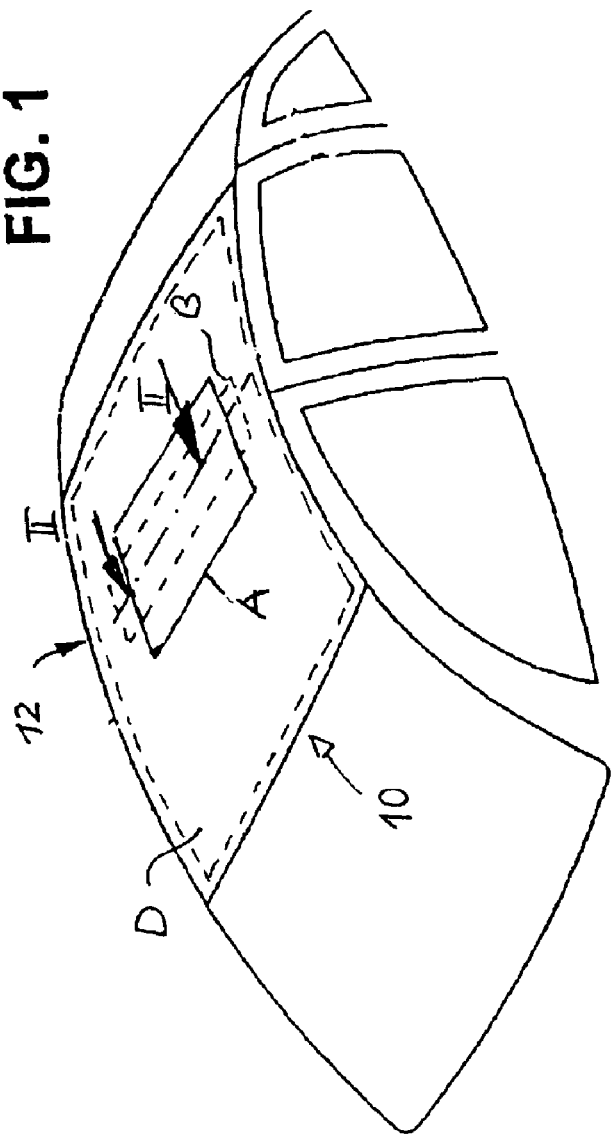

MULTI-LAYERED VEHICLE BODY PART AND METHOD OF MANUFACTURE

REFERENCE TO RELATED APPLICATIONS

The present invention claims priority to German Patent Application No. 102 07 295.7, filed Feb. 21, 2002.

TECHNICAL FIELD

The invention relates to mountable vehicle body parts, and more particularly to a vehicle body part made from multiple layers.

BACKGROUND OF THE INVENTION

Mountable vehicle body parts are attached to a vehicle body so that the part defines the outer, visible skin of the vehicle after it is installed. Ideally, these mountable vehicle body parts should be relatively lightweight, match visually with adjoining painted parts in the vehicle and have high surface quality (i.e., have a "Class A" surface finish). The mountable vehicle body parts should also have good thermal properties and good sound insulation properties. Plastic composite parts have been particularly advantageous in incorporating these desired properties.

The properties of mountable vehicle body parts have made them particularly suitable for roof modules, including roof modules having a sliding roof unit as well as lamella roofs. Although the description below focuses on roof modules, the description is also applicable to other mountable vehicle body parts, such as vehicle doors and flaps (e.g., engine hoods, trunk lids).

Currently known roof modules are manufactured as a composite part having an outer portion made of a dyed plastic sheet. The outer portion of the sheet is visible when the roof module is installed to the vehicle body. The dye preferably penetrates the entire thickness of the sheet. A fiber-reinforced plastic backing, such as a backing made from polyurethane reinforced with glass fiber, is attached to an inner surface of the plastic sheet. The glass fibers may be injected into the polyurethane by a long fiber injection (LFI) method so that the fibers contact the inside surface of the plastic sheet. Ideally, the plastic sheet should be kept as thin as possible to minimize the weight of the vehicle part, but any fibers that are not arranged parallel to the outer surface can be seen through the plastic sheet if the sheet is too thin. Further, direct contact between the fibers and the inner surface of the plastic sheet may create small bumps on the outer surface of the plastic sheet, diffusing light incident on the plastic sheet and creating a dull appearance. Existing mountable vehicle body parts use a plastic sheet that is thick enough to prevent the fibers contacting the sheet from appearing on the outer surface, but the added thickness adds undesirable weight to the vehicle part.

There is a desire for a mountable vehicle body part which meets the high visual specifications with regard to its outer appearance while still minimizing the weight of the part.

SUMMARY OF THE INVENTION

The invention is directed to a mountable vehicle body part having an outer surface that is visible when the part is mounted to a vehicle body. The vehicle body part comprises an outer layer made of a thin, dyed plastic sheet, an inner fiber-reinforced plastic layer, and a protective layer between the plastic sheet and the fiber-reinforced layer. In one embodiment, the protective layer is made of plastic and is configured so that it prevents direct contact between the fibers in the fiber-reinforced layer and the plastic sheet. As a result, the protective layer prevents the fibers from marring the outside appearance of the plastic sheet, ensuring that the outer surface of the plastic sheet remains smooth without having to increase the thickness of the plastic layer itself.

The invention is also directed to a method of manufacturing a mountable vehicle body part by applying a protective layer to an inner surface of the plastic sheet to form an intermediate product and then applying a foamed plastic backing layer to the intermediate product. Fibers are then added to the backing layer to form the fiber-reinforced layer.

Other variations of the invention will be apparent in view of the description below and the associated drawings.

BRIEF DESCRIPTION OF THE DRAWINGS

FIG. 1 is a representative perspective view of a vehicle roof with a mountable vehicle body part according to the invention;

DETAILED DESCRIPTION OF THE PREFERRED EMBODIMENTS

For purposes of illustration only, the description below specifies a roof module. However, the description is applicable to any mountable vehicle structure without departing from the scope of the invention.

FIG. 1 illustrates a vehicle roof 10 having at least one portion where the roofs skin is formed by a mountable vehicle body part 12. The mountable vehicle body part can be, for instance, a complete roof module D, the cover A or the lamella B for closing the roof opening. As noted above, other possible applications for the inventive mountable vehicle body part include vehicle doors and closures as well as sections of the vehicle's outer skin.

Figure 2:
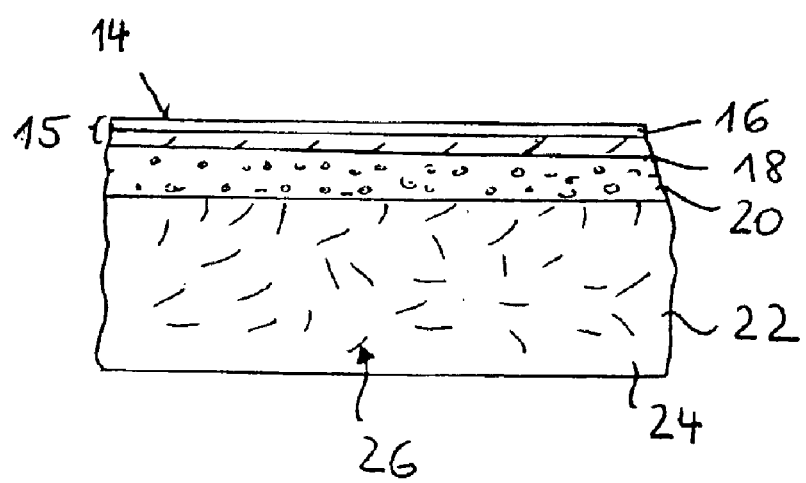
FIG. 2 is a partial section view of the inventive vehicle body part along line II—II in FIG. 1.

The vehicle body part 12, which is shown in section view in FIG. 2, is a composite part comprising several layers bonded to each other. An outer surface 14 of the vehicle body part 12 is visible when the part 12 is installed to the vehicle body. In one embodiment, the outside of the vehicle body part 12 is a plastic sheet 15 having a multi-layered configuration. The plastic sheet 15 is preferably very thin (e.g., <1.3 mm) and has a hard covering layer 16 and an inner carrier layer 18.

In one embodiment, the plastic sheet 15 is a double-layered, co-extruded sheet that can reach a level of deformation during deep-drawing that is substantially higher than the level of deformation possible with sheet metal. The covering layer 16 is made of a hard material such as, for example, polymethylmethacrylate (PMMA). The covering layer 16 is about <0.4 mm and can be either transparent or penetration-dyed. The inner surface of the covering layer 16 is bonded to a penetration-dyed carrier layer 18. The carrier layer 18 is preferably made of a mixture of polycarbonate (PC) and acrylonitril-styrene-acrylate-copolymer (ASA). By manufacturing either the covering layer 16, the carrier layer 18, or both from a penetration-dyed plastic, the part 12 can be manufactured without any painting steps while still preserving a high-quality outer appearance (e.g., a class A surface finish).

As shown in FIG. 2, a protective layer 20 is attached to an inner surface of the carrier layer 18. The protective layer 20 is preferably soft enough to allow reinforcement fibers from another layer, such as an adjoining fiber-reinforced layer 22, to enter the protective layer 20 without penetrating through it. Possible protective layer 20 materials include foam, soft plastic, or lacquer. In one embodiment, the protective layer 20 is made of a low-density plastic material, such as a foamed plastic having an open cell structure.

The fiber-reinforced layer 22 immediately adjoins the protective layer 20. In one embodiment, the fiber-reinforced layer 22 is thicker than the protective layer 20. The fiber-reinforced, thicker layer 22 may be made of a base material, such as a polyurethane or other plastic foam 24, and reinforcing fibers 26 incorporated in the foam 24. In one embodiment, the reinforcing fibers 26 are glass fibers loaded into the foam 24 a long fiber injection (LFI) method. The fiber-reinforced layer 22 should be applied directly to the protective layer 20 as a foamed backing to ensure secure bonding between the layers 20, 22 while keeping the manufacturing method for the layers 20, 22 simple and inexpensive.

Note that the foam material 24 in the fiber-reinforced layer 22 may penetrate the protective layer 20 at the interface between the two layers 20, 22 and contact the inner surface of the plastic sheet 15 despite the presence of the protective layer 20. In this case, the protective layer 20 is soaked with the foam material 24 of the fiber-reinforced layer 22, effectively bonding the foam material 24 to the inner surface of the carrier layer 18. However, even if the protective layer 20 is thinner than the plastic sheet 15 and is made of open cell foam, it can still effectively prevent the reinforcing fibers 26 from the fiber-reinforced layer 22 from contacting the carrier layer 18 of the plastic sheet 15. By acting as a barrier between the fibers 26 and the carrier layer 18, the protective layer 20 prevents the fibers 26 from appearing on the outer surface 14 as small bumps, thereby preserving a high-quality appearance on the outer surface 14.

To manufacture the inventive mountable vehicle body part, the plastic sheet 15 is first produced by forming and bonding the covering layer 16 and the carrier layer 18. Either the carrier layer 18, the covering layer 16, or both may be penetration-dyed with the desired part color. If only the carrier layer 18 is dyed, the covering layer 16 is left clear. The vehicle body part is then formed by processing the plastic sheet 15 in an appropriate deep-drawing mold having a desired geometry.

Figure 3:
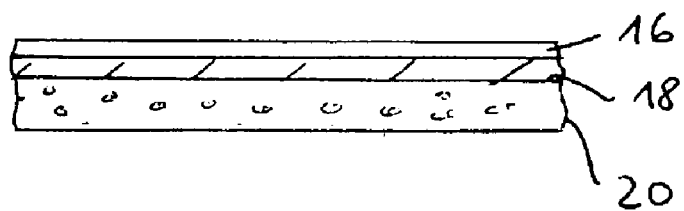
FIG. 3 is a section view of the inventive vehicle body part according to the invention during an intermediate step of its manufacture.

Next, the protective layer 20 is applied to the inner surface of the carrier layer 18. The protective layer 20 can be applied as a foam backing or a soft plastic material layer to the carrier layer 18 via any appropriate process, such as co-extrusion, lamination, lining or foaming. The resulting intermediate product, as shown in FIG. 3, then placed in an appropriate mold with another foam layer 24 that will eventually form the fiber-reinforced layer 22. As noted above, reinforcement fibers 26 can be injected into the foam layer 24 using the LFI method to produce the fiber-reinforced layer 22.

Alternatively, the protective layer 20 can be applied to the inside of the plastic sheet 15 before the deep-drawing process to form an intermediate product. In this case, both the plastic sheet 15 and the protective layer 20 are deep drawn together after they are joined together. After the intermediate product is deep-drawn, it is provided with the foam layer 24 that eventually becomes the fiber-reinforced layer 22. In either case, the foam material 24 in the fiber-reinforced layer 22 may penetrate the protective layer 20 and bond to the inner surface of the plastic sheet 15, bonding the protective layer 20 firmly to the plastic sheet 15 as well.

As a result, the multi-layered structure of the invention allows a thin, penetration-dyed plastic sheet to be used in a mountable vehicle body part while maintaining a high-quality outside surface finish. The protective layer in the inventive structure prevents the fibers in the fiber-reinforced layer from contacting the plastic sheet and marring the surface finish of the part even if the base material of the fiber-reinforced layer penetrates the protective layer and contacts the plastic sheet. Reducing the thickness of the plastic sheet reduces the weight of the vehicle body part.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A mountable vehicle body part, comprising:
    a plastic sheet having a outer surface that is visible when the vehicle body part forms part of a vehicle body, wherein the plastic sheet has at least one dyed portion;
    a fiber-reinforced layer having a base material and a plurality of reinforcing fibers disposed in the base material; and
    a protective layer disposed between the plastic sheet and the fiber-reinforced layer to prevent contact between the reinforcing fibers and the plastic sheet.

2. The vehicle body part of claim 1, wherein the vehicle body part is one selected from the group consisting of a roof module and a vehicle closure.

3. The vehicle body part of claim 1, wherein said plastic sheet comprises:
    a carrier layer; and
    a covering layer disposed on the carrier layer, wherein the covering layer forms the outer surface.

4. The vehicle body part of claim 3, wherein the carrier layer and the covering layer together form a double-layered co-extruded sheet.

5. The vehicle body part of claim 3, wherein the carrier layer and the covering layer are both penetration-dyed.

6. The vehicle body part of claim 3, wherein the carrier layer is penetration-dyed and the covering layer is clear.

7. The vehicle body part of claim 1, wherein the base material in the fiber-reinforced layer is a foamed plastic, and wherein the plurality of reinforcing fibers are glass fibers.

8. The vehicle body part of claim 1, wherein the base material in the fiber-reinforced layer is a polyurethane foam.

9. The vehicle body part of claim 1, wherein the base material in the fiber-reinforced layer penetrates the protective layer and bonds to an inner surface of the plastic sheet.

10. The vehicle body part of claim 1, wherein the fiber-reinforced layer is applied to the protective layer as a foamed backing layer.

11. The vehicle body part of claim 1, wherein the protective layer is formed from a material selected from the group consisting of foam, soft plastic, and lacquer.

12. The vehicle body part of claim 1, wherein the outer surface of the plastic sheet has a class A surface finish.

13. A method of manufacturing a mountable vehicle body part, comprising:
    applying a protective layer to an inner surface of a plastic sheet to form an intermediate product;
    applying a backing layer of base material to the intermediate product; and adding a plurality of reinforcing fibers to the base material to form a fiber-reinforced layer, wherein the protective layer prevents contact between the reinforcing fibers and the plastic sheet.

14. The method of claim 13, wherein the step of adding the reinforcing fibers is conducted via a long fiber injection (LFI) process.

15. The method of claim 13, wherein the step of applying the protective layer to the plastic sheet is conducted with a method selected from the group consisting of co-extrusion, lamination, lining or foaming.

16. The method of claim 13, wherein the base material penetrates the protective layer and contacts the inner surface of the plastic sheet.

17. The method of claim 13, further comprising deep-drawing the plastic sheet before applying the protective layer to form the vehicle part.

18. The method of claim 13, further comprising deep-drawing the intermediate product to form the vehicle part.

19. The method of claim 13, wherein said plastic sheet comprises a covering layer and a carrier layer, and wherein the method comprises co-extruding the covering layer and the carrier layer.

20. The method of claim 19, further comprising deep-drawing the covering layer and the carrier layer to form the vehicle part.

* * * * *